United States Patent [19]
Sato

[11] Patent Number: 5,452,134
[45] Date of Patent: Sep. 19, 1995

[54] ZOOM LENS OF TWO-UNIT CONSTRUCTION

[75] Inventor: Haruo Sato, Kawasaki, Japan

[73] Assignee: Nikon Corporation, Tokyo, Japan

[21] Appl. No.: 210,779

[22] Filed: Mar. 21, 1994

Related U.S. Application Data

[63] Continuation of Ser. No. 951,019, Sep. 25, 1992, abandoned.

[30] Foreign Application Priority Data

Sep. 30, 1991 [JP] Japan .................................. 3-251188

[51] Int. Cl.⁶ ........................ G02B 15/14; G02B 13/18
[52] U.S. Cl. ................................... 359/682; 359/691; 359/713
[58] Field of Search ............... 359/682, 685, 691, 708, 359/713, 771, 793

[56] References Cited

U.S. PATENT DOCUMENTS

| | | | |
|---|---|---|---|
| 4,195,912 | 4/1980 | Doi et al. | 359/682 |
| 4,304,466 | 12/1981 | Betensky | 359/682 |
| 4,400,064 | 8/1983 | Ikemori et al. | 359/682 X |
| 4,469,412 | 9/1984 | Tajima et al. | 359/708 X |
| 4,477,153 | 10/1984 | Suda et al. | 359/708 X |
| 4,560,253 | 12/1985 | Ogino | 359/682 |
| 4,585,314 | 4/1986 | Tateoka | 359/682 X |
| 5,076,677 | 12/1991 | Sato | 359/708 X |
| 5,182,673 | 1/1993 | Kikuchi et al. | 359/691 |

Primary Examiner—William L. Sikes
Assistant Examiner—David R. Parsons
Attorney, Agent, or Firm—Shapiro and Shapiro

[57] ABSTRACT

In a zoom lens of two-unit construction comprising a first lens unit having negative refractive power as a whole and a second lens unit having positive refractive power as a whole, the first lens unit comprises, in succession from the object side, a negative lens having its concave surface of sharp curvature facing the image side and a positive lens having its convex surface facing the object side, the second lens unit has, in succession from the object side, at least a positive lens, a positive lens, a negative lens having its concave surface of sharp curvature facing the image side, and a positive lens having its convex surface of sharp curvature facing the image side, the first lens unit has at least one aspherical surface, and the zoom lens satisfies the condition that $0.65 < |f_1/(f_W \cdot f_T)^{\frac{1}{2}}| \leq 1.1$.

22 Claims, 6 Drawing Sheets

ZOOM LENS OF TWO-UNIT CONSTRUCTION

This is a continuation of application Ser. No. 951,019 filed Sep. 25, 1992, now abandoned.

BACKGROUND OF THE INVENTION

1. Field of the Invention

This invention relates to a zoom lens of two-unit construction comprising, in succession from the object side, a lens unit of negative refractive power and a lens unit of positive refractive power.

2. Related Background Art

In interchangeable lenses for 35 mm still cameras, there is the impression that in recent years, lenses which are zoom lenses of two-unit construction having negative and positive refractive powers in succession from the object side and which include the standard angle of view and have a magnification change ratio of about 1.8 times have completely taken root as lenses standard-mounted in place of standard lenses (in case of 35 mm format, lenses of about 50 mm). Accordingly, a zoom lens of this type is carried while remaining a mounted as a commonly used lens on a camera body and therefore, its minimum downsizing is a requisite condition and further, it is necessary that such lens keep a sufficient imaging performance and yet be compact and inexpensive.

To realize such a so-called standard zoom lens, the zoom lens of two-unit construction as described above is the most suitable lens type, and various lenses of such type have heretofore been proposed. Among the heretofore proposed lenses, there are ones disclosed in U.S. Pat. No. 4,195,912 and U.S. Pat. No. 4,560,253 as examples in which a first lens unit comprises only two lenses, i.e., a negative lens and a positive lens and which has achieved a low cost.

At the present time, however, standard zoom lenses including the standard angle of view and having a magnification change ratio of 2.1 times or greater are becoming the main stream as lenses standard-mounted on camera bodies, and in such lenses, as in the aforedescribed standard zoom lenses having a magnification change ratio of about 1.8 times, downsizing and low cost are requisite conditions. In the conventional zoom lenses having a magnification change ratio of about 1.8 times, to realize low cost and downsizing while keeping a sufficient performance, zoom lenses of two-unit construction have been suitable. However, when a magnification change ratio of two times or greater is to be secured, it has been difficult to use the conventional compact two-unit lens type as it is, and it has been usual that the lens becomes bulky in order to keep the imaging performance thereof sufficiently. So, the present situation is that efforts are made to make downsizing and a high performance compatible by the use of a zoom lens type of three-unit construction which comprises three negative, positive and negative units and which is of the type in which a third unit is fixed and which is relatively simple in structure.

As described above, in standard zoom lenses having a magnification change ratio of 2.1 times or greater, zoom lenses of three-unit construction have become the mainstream from the viewpoint of downsizing. However, the increase of one unit basically in the unit construction leads to an increase in cost and is not preferable. Also, basically in these three-unit zoom lenses, the type in which a negative unit is installed as a fixed unit rearwardly of a two-unit zoom lens and the back focal length is made small to thereby achieve downsizing is the mainstream, and to make the lens sufficiently compact, it is necessary to make the refractive power of the last negative third unit sufficiently great. Accordingly, it becomes necessary to achromatize in the third unit, and to achromatize sufficiently, it is necessary to increase at least two lenses as compared with a two-unit zoom lens, and apparently this leads to an increased cost. Also, if a zoom lens is forced to be constructed of the same number of lenses as in a two-unit zoom lens, a deteriorated performance will be unavoidable. Also, at the telephoto end, the telephoto ratio (the ratio of the distance from the foremost surface to the focal plane of the lens to the focal length) will become small due to the third unit and therefore a problem in manufacture such as eccentricity will arise, and this is not preferable.

Accordingly, it has been necessary that a zoom lens which is very compact and low in cost and has a good performance and a magnification change ratio of 2.1 times or greater be realized by a two-unit zoom lens.

Also, in the zoom lens disclosed in U.S. Pat. No. 4,195,912, in spite of the magnification change ratio being as small as the order of 1.6–1.8 times, the full length is great and the diameter of the fore lens is also large. Particularly at the wide angle end, the full length becomes remarkably great and therefore, an oblique ray incident on the fore lens passes a location farther from the optical axis and thus, the diameter of the fore lens becomes remarkably large, and this has led to the disadvantage that the zoom lens becomes bulky as a whole. Also, the refractive power of the second lens unit is weak and therefore, the full length becomes much greater, and the amount of movement of each lens unit has been great. In terms also of aberrations, the fluctuation of coma and curvature of image field have not been good for the large size of the entire lens.

In the zoom lens disclosed in the aforementioned U.S. Pat. No. 4,560,253, the full length of the lens system is relatively small and the zoom lens is compact, but particularly at the wide angle end, the full length is great and an oblique ray incident on the fore lens passes a location farther than the optical axis, and this has led to the disadvantage that the diameter of the fore lens becomes large. Accordingly, this leads to the large size and increased cost of the entire first lens unit. Particularly the large size of the first lens unit including an aspherical lens leads to a further increase in cost, and this is not preferable.

Further, the zoom lenses heretofore proposed as described above are set to such a refractive power arrangement that the full length becomes greatest at the wide angle end and therefore, the amount of movement of each unit becomes great, and this has led to the problem that when the zoom lens is made into a compact construction having a small full length, the designing of the lens barrel becomes difficult and complicated and this leads to an increase in cost.

SUMMARY OF THE INVENTION

So, it is an object of the present invention to provide a zoom lens of two-unit construction which has a magnification change ratio of 2.1 times or greater and which is compact over the entire magnification change range and simple in construction and yet has a good imaging performance.

The present invention is a zoom lens of two-unit construction which is comprised of two lens units, i.e., a first lens unit G1 having negative refractive power as a whole, and a second lens unit G2 having positive refractive power as a whole, and in which the spacing between the first lens unit G1 and the second lens unit G2 is varied to thereby effect a magnification change, and wherein the first lens unit G1 comprises, in succession from the object side, a negative lens L1 having its concave surface of sharp curvature facing the image plane and a positive lens L2 having its convex surface facing the object side, and the second lens G2 has, in succession from the object side, at least a positive lens L3, a positive lens L4, a negative lens L5 having its concave surface of sharp curvature facing the image side and a positive lens 16 having its convex surface of sharp curvature facing the image side, and the first lens unit G1 has at least one aspherical surface, the zoom lens satisfying the following conditions:

$$0.6 \leq |f_1/(f_W \cdot f_T)^{\frac{1}{2}}| \leq 1.1 \quad (1)$$

$$0.3 \leq |f_1|/f_T \leq 0.83 \quad (2)$$

$$0.3 \leq f_2/f_T \leq 0.6 \quad (3)$$

$$0.005 \leq d_{5-6}/f_T \leq 0.06 \quad (4)$$

$$1.7 \leq n_1, \ \nu d_1 \leq 55 \quad (5)$$

$$1.65 \leq n_2, \ \nu d_2 \leq 36 \quad (6)$$

$$0.53 \leq d_{1-2}/D_1 \leq 0.8 \quad (7)$$

$$0.1 d_5/D_2 0.5 \quad (8)$$

$$0.0005 |AS-S|/f_T 0.01 \quad (9)$$

where $f_1$: focal length of the first lens unit G1, $f_W$: focal length of the entire system at the wide angle end, $f_T$: focal length of the entire system at the telephoto end, $f_2$: focal length of the second lens unit G2, $d_{5-6}$: the on-axis air gap from that surface of the negative lens L5 in the second lens unit G2 which is most adjacent to the image side to that surface of the positive lens L6 which is most adjacent to the object side, $n_1$: refractive index of the negative lens L1 in the first lens unit G1 for d-line (but in case of a compound type aspherical lens formed of a compound material of glass and plastic, the refractive index of glass which is the parent body thereof), $n_2$: refractive index of the positive lens L2 in the first lens unit G1 for d-line (but in case of a compound type aspherical lens formed of a compound material of glass and plastic, the refractive index of glass which is the parent body thereof), $\nu d_1$: Abbe number of the positive lens L1 in the first lens unit G1 (but in case of a compound type aspherical lens formed of a compound material of glass and plastic, the Abbe number of glass which is the parent body thereof), $\nu d_2$: Abbe number of the positive lens L2 in the first lens unit G1 (but in case of a compound type aspherical lens formed of a compound material of glass and plastic, the Abbe number of glass which is the parent body thereof), $d_{1-2}$: the on-axis air gap between the negative lens L1 and the positive lens L2 in the first lens unit G1, $d_5$: the on-axis center thickness of the negative lens L5 in the second lens unit G2 (but in case where the negative lens L5 is a cemented negative lens, the center thickness of the cemented negative lens portion), $D_1$: the on-axis combined thickness from that surface of the first lens unit G1 which is most adjacent to the object side to that surface thereof which is most adjacent to the image side, $D_2$: the on-axis combined thickness from that surface of the second lens unit G2 which is most adjacent to the object side to that surface thereof which is most adjacent to the image side, $|AS-S|$: the difference in the direction of the optical axis between the aspherical surface on the most marginal edge $\phi$ of the effective diameter of said aspherical surface and a reference spherical surface having a predetermined vertex radius of curvature.

Generally, in a zoom lens of two-unit construction, when constructed in the relation that $$f_1 \leq -(f_W \cdot f_T)^{\frac{1}{2}},$$

where $f_W$ is the focal length at the wide angle end, $f_T$ is the focal length at the telephoto end and $f_1$ is the focal length of a first lens unit, the full lengths at the wide angle end and the telephoto end become equal to each other and the variation in the full length by a magnification change becomes smallest. Accordingly, it is not preferable to choose the focal length of the first lens unit so that this relation may remarkably deviate, because the variation in the full length by a magnification change increases remarkably. Also, when the magnification of a converging unit as a second lens unit is $\beta_T$, there is the relation that $$f_T = f_1 \cdot \beta_T$$

and therefore, to achieve compactness, it is necessary on the telephoto side that the second lens unit G2 be used beyond one-to-one magnification, and when good aberration correction is to be effected, each lens unit is used at relatively strong refractive power in order to satisfy the above-mentioned relations, and there has heretofore been a tendency to construct each lens unit of many lenses and it has sometimes happened that each lens unit becomes thick and the effect of downsizing is thinned.

In the present invention, however, unlike the prior art the above-mentioned relations are taken into consideration to thereby set a refractive power arrangement suitable for downsizing and also, the first lens unit which is a diverging lens unit is constructed of two lenses, i.e., a negative lens L1 and a positive lens L2, thereby realizing a zoom lens which is compact and moreover small in the variation in the full length by a magnification change as well as low in cost.

That is, conditional expression (1) is an expression regarding the aforementioned variation in the full length in the whole area of magnification change. When the value of this expression is a value exceeding 1.0, it means that the full length becomes greatest at the wide angle end, and when the value of this expression is less than 1.0, it means that the full length becomes greatest at the telephoto end. If the upper limit of conditional expression (1) is exceeded, the full length will become remarkably great at the wide angle end and therefore, the diameter of the fore lens will be increased, and this leads not only to the bulkiness of the entire lens system, but also to increase in cost. Also, if the diameter of the fore lens is forced to become small, the marginal quantity of light will be deficient and this is not preferable. Also, the variation in the full length by a magnification change will become remarkably great and as a matter of lens barrel design, downsizing will become difficult and this is neither preferable. If conversely, the lower limit of conditional expression (1) is exceeded, the full length will become remarkably great at the telephoto end and again as a matter of lens barrel design, downsizing will become difficult. Also, the full length will be relatively small at the wide angle end and this is advantageous for the downsizing of the diameter of the fore lens and an increase in the marginal quantity of light, but not only the correction of downward coma particularly at the wide angle side and spherical aberration at the telephoto side will become difficult, but also the fluctuation of downward coma by a magnification change will remarkably increase and become difficult to correct, and in a zoom lens comprising an extremely small number of lenses as in the present invention, it will become impossible to obtain a good performance. In the range of conditional expression (1), it is possible to display the effect of the present invention, but if the upper limit is 1.05 or less and the lower limit is 0.65, the full length at the wide angle end can be made small and therefore, it will be possible to enhance the effect of the present invention.

Conditional expression (2) sets the ratio of the focal length of the first lens unit G1 to the focal length of the telephoto end, and if the upper limit of this conditional expression is exceeded, the negative refractive power of the entire first lens unit G1 will weaken and therefore, the fore lens system will become bulky and further, the entire system will become bulky, and this is not preferable. The fluctuation of the full length by a magnification change will also become great and this is neither preferable. If the lower limit of conditional expression (2) is exceeded, the negative refractive power of the entire first lens unit G1 will remarkably strengthen and therefore, downward coma and chromatic coma (the difference between comas created by the difference between the wavelengths of rays) at the wide angle side will increase and downward coma and spherical aberration at the telephoto side will be aggravated, and this is not preferable. In the range of conditional expression (2), it is possible to display the effect of the present invention, but if the upper limit is 0.8 or less and the lower limit is 0.35, the effect of the present invention will be obtained more effectively. If the value of the upper limit is 0.75, the effect of the present invention can be further enhanced.

Conditional expression (3) sets the ratio of the focal length of the second lens unit G2 to the focal length of the telephoto end. If the focal length of the second lens unit G2 is made small, the back focal length will become small and the entire lens system can be made compact. As a matter of fact, however, the refractive power will become strong and therefore, the burden to aberration correction will increase. Therefore, it is necessary to set the refractive power of the second lens unit to an appropriate value. If the upper limit of conditional expression (3) is exceeded, the refractive power of the second lens unit G2 will weaken and therefore, the back focal length of the lens system will assume a remarkably great value and the full length will become great, and this is against compactness and is not preferable. In addition, the lens aperture will become great, and this leads to an increase in cost. Also, if the lower limit of this conditional expression is exceeded, the refractive power of the second lens unit G2 will become remarkably strong and the full length will become small, but the spherical aberration at the telephoto side will be remarkably aggravated and the fluctuation of spherical aberration by a magnification change will increase, and this is not preferable. Also, to correct this spherical aberration and yet keep good balance with the other aberrations, the number of lens components of the second lens unit must be increased and the entire lens system becomes thick, whereby the effect of downsizing is thinned, and this is neither preferable. In the range of conditional expression (3), it is possible to display the effect of the present invention, but if the upper limit value of this conditional expression is 0.56, the effect of the present invention will be obtained more effectively. If the upper limit value is 0.52, the effect of the present invention can be further enhanced.

Conditional expression (4) is a condition for setting the on-axis air gap between the negative lens or cemented negative lens L5 in the second lens unit G2 and the positive lens L6 lying on the image side thereof. This air gap not only plays an important role to determine the position of the principal point of the second lens unit G2, but also affects the correction of upward coma and the spherical aberration at the telephoto side. If the upper limit of conditional expression (4) is exceeded, the principal point of the second lens unit will move more toward the image side, and the air gap between the first lens unit G1 and the second lens unit G2 will decrease and thus, the first lens unit G1 and the second lens unit G2 will mechanically interfere with each other at the telephoto side. Originally, with a zoom lens of two-unit construction, it is often the case that the second lens unit adopts a lens construction of the tele type or the zoner type in which the principal point lies relatively adjacent to the object side, and this is for solving the problem of the degree of freedom of aberrations and the above-noted basic problem of securing the spacing between the first lens unit G1 and the second lens unit G2. If the lower limit of conditional expression (4) is exceeded, it will become possible to secure the spacing between the first lens unit G1 and the second lens unit G2 easily, but the negative lens L5 and the positive lens L6 in the second lens unit G2 will become two close to each other with a result that the appropriate aberration correction balance by a certain degree of thickening of the second lens unit G2 will be destroyed. Therefore, particularly at the telephoto side, the separation of the on-axis ray and the off-axis ray rearward of the second lens unit G2 will become difficult, and upward coma will be aggravated and the fluctuation of upward coma during a magnification change will increase, and this is not preferable. Accordingly, to realize a two-unit zoom lens which is compact and good in performance, this range is desirable. If the upper limit value of conditional expression (4) is 0.04, the effect of the present invention can be further enhanced.

Conditional expressions (5) and (6) set the appropriate values of the refractive indices and Abbe numbers of the negative lens L1 and positive lens L2 in the first lens unit G1. Since the first lens unit is comprised of two positive and negative lenses which is the achromatizable minimum number, the first lens unit G1 is made extremely thin and can realize a compact construction. As shown in conditional expression (1), the first lens unit is used in relatively strong refractive power and therefore involves a great difficulty in aberration correction, and to accomplish good aberration correction even if an aspherical surface is introduced, the selection of an appropriate optical material becomes necessary. Accordingly, if the refractive indices of the negative lens L1 and positive lens L2 in the first lens unit G1 are remarkably low, not only the radii of curvature of the negative lens L1 and positive lens L2 will become small and the degree of freedom of monochromatic aberration will be reduced, but also it will become impossible to set Petzval sum to an appropriate value. Further, since the first lens unit G1 is comprised of only two positive and negative lenses, the selection of the Abbe numbers of the respective lenses has an important meaning.

Accordingly, when conditional expression (5) is not satisfied, that is, when the refractive indices are low, the degree of freedom of aberration correction is reduced as described above and particularly the fluctuation of downward coma by a magnification change and the fluctuation of curvature of image field by a magnification change increase, and this is not preferable. Also, when the Abbe numbers are great, the correction of chromatic difference of magnification becomes difficult, and this is neither preferable. Also, when conditional expression (6) is not satisfied, that is, when the refractive indices are low, the fluctuation of downward coma by la magnification change and the fluctuation of curvature of image field by a magnification change increase and the correction of spherical aberration at the telephoto side becomes difficult, and this is not preferable. Also, when the Abbe numbers are great, the fluctuations of chromatic difference of magnification and on-axis chromatic aberration by a magnification change increase, and this is neither preferable.

Conditional expression (7) is a condition for appropriately setting the on-axis air gap between the negative lens L1 and the positive lens L2 in the first lens unit G1. If the upper limit of this conditional expression is exceeded, the principal point of the first lens unit will move toward the object side and the air gap between the first lens unit G1 and the second lens unit G2 will decrease and at last, the first lens unit G1 and the second lens unit G2 will mechanically interfere with each other, and this is not preferable. Also, if the lower limit of this conditional expression is exceeded, the first lens unit G1 will be remarkably thinned and as previously described, the degree of freedom of aberration correction will be remarkably reduced with a result that chiefly off-axis aberrations such as downward coma and curvature of image field will be aggravated, and this is not preferable. Also, by the principal ray lowering, the diameter of the negative lens L1 will be increased, and this is against compactness and is not preferable. If the upper limit value of this conditional expression is 0.72 and the lower limit value of this conditional expression is 0.56, the effect of the present invention can be further displayed.

Conditional expression (8) is a condition for appropriately setting the center thickness of the negative lens (or the cemented negative lens) L5 in the second lens unit G2. If the upper limit of this conditional expression is exceeded, the second lens unit will become too thick, and this is not only against compactness and is not preferable, but also leads to an increase in cost and is not preferable. If the lower limit of this conditional expression is exceeded, particularly the correction of spherical aberration at the telephoto side will become difficult, and this is not preferable particularly when the refractive power of the second lens unit is relatively strong as in the present invention. If the lower limit value of conditional expression (8) is 0.14, the effect of the present invention can be further displayed.

Now, in the present invention, the aspherical surface introduced into the first lens unit G1 is an aspherical surface particularly effective for the correction of distortion at the wide angle side as well as for the correction of spherical aberration at the telephoto side. Accordingly, it has such a shape that the negative refractive power decreases toward the marginal portion of the lens. Conditional expression (9) is a condition which prescribes the shape of this aspherical surface introduced into the first lens unit G1, i.e., an appropriate range for the magnitude of the sag amount. If the upper limit of this conditional expression is exceeded, the sag amount will increase remarkably and not only chiefly off-axis aberrations such as coma and curvature of image field will be aggravated by the influences of high-order aberrations and this is not preferable, but also the manufacture of the aspherical surface will become difficult, and this leads to an increase in cost and is not preferable. Also, if the lower limit of this conditional expression is exceeded, the sag amount will decrease remarkably and the effect of the aspherical surface will be thinned and the correction of said distortion will become impossible, and this is not preferable. Accordingly, to make the effect of the aspherical surface displayed sufficiently at a low-cost, this range is realistically desirable.

As described above, according to the present invention, there is achieved a zoom lens of two-unit construction which has a magnification change ratio of 2.1 times or greater and which is compact over the entire magnification change range and is simple in construction and yet has a good imaging performance.

DETAILED DESCRIPTION OF THE PREFERRED EMBODIMENTS

Figure 1:
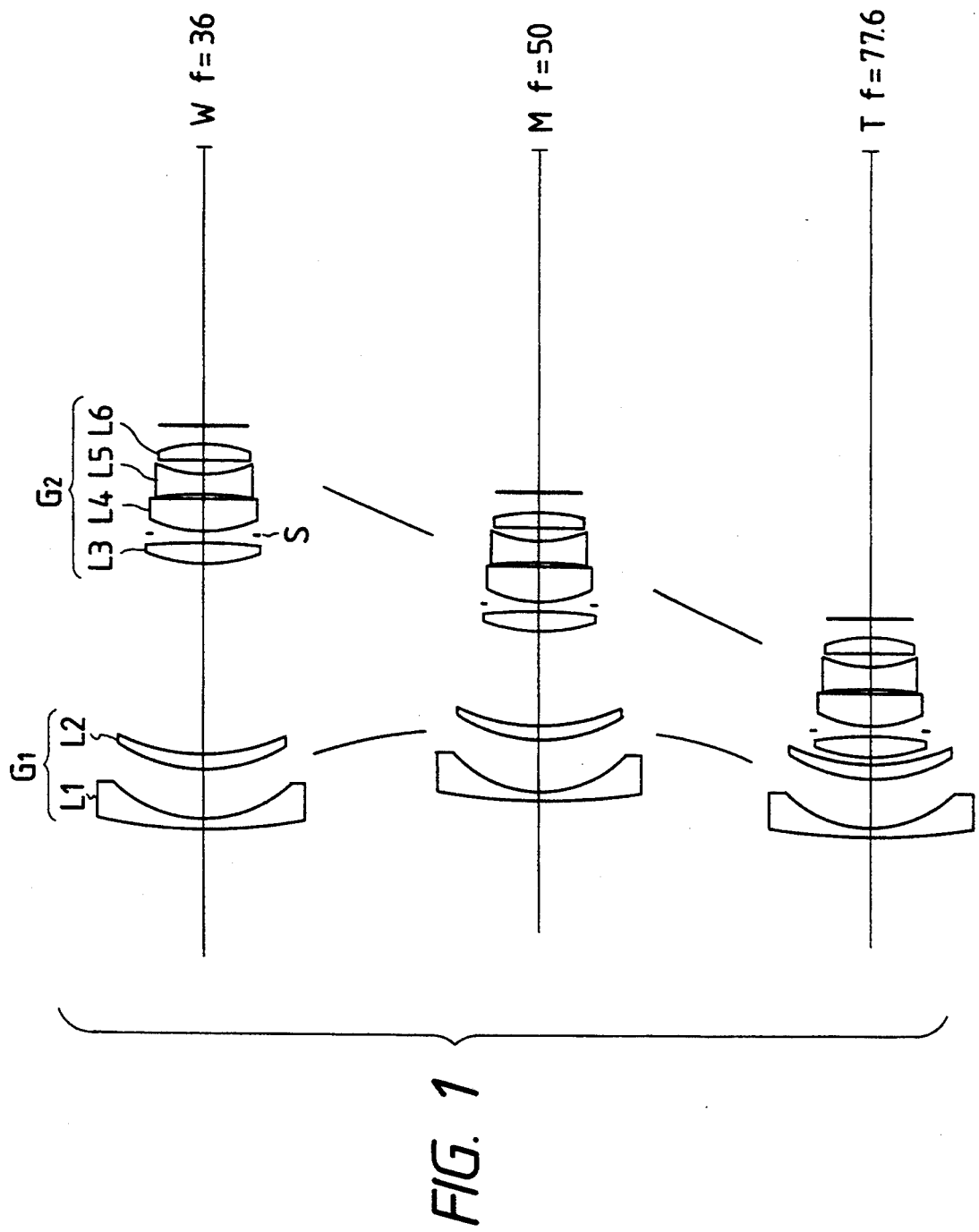
FIG. 1 shows the lens construction of a first embodiment of the present invention.

Some embodiments of the present invention will hereinafter be described. In the construction of a first embodiment of the present invention, as shown in FIG. 1, a first lens unit G1 comprises, in succession from the object side, a negative meniscus lens L1 having its convex surface facing the object side, and a positive meniscus lens L2 also having its convex surface facing the object side. A second lens unit G2 comprises, in succession from the object side, a biconvex positive lens L3 having its surface of sharper curvature facing the object side, a positive meniscus lens L4 having its convex surface facing the object side, a biconcave negative lens L5 having its surface of sharper curvature facing the image side, and a positive meniscus lens L6 having its convex surface facing the image side. An iris diaphragm S is disposed between the positive lenses L3 and L4 in the second lens unit G2, and a fixed diaphragm for intercepting off-axis marginal rays is provided rearwardly of and integraly with the second lens unit G2. The location of the fixed diaphragm is shown as a straight line rearward of the second lens unit G2 in FIG. 1.

As shown in FIG. 1, during the magnification change from the wide angle end W to the telephoto end T, the second lens unit G2 is moved substantially linearly toward the object side and the first lens unit G1 is substantially reciprocally moved so as to be located more toward the image side than toward the wide angle end W and the telephoto end T in a medium focal length state M.

Figure 2:
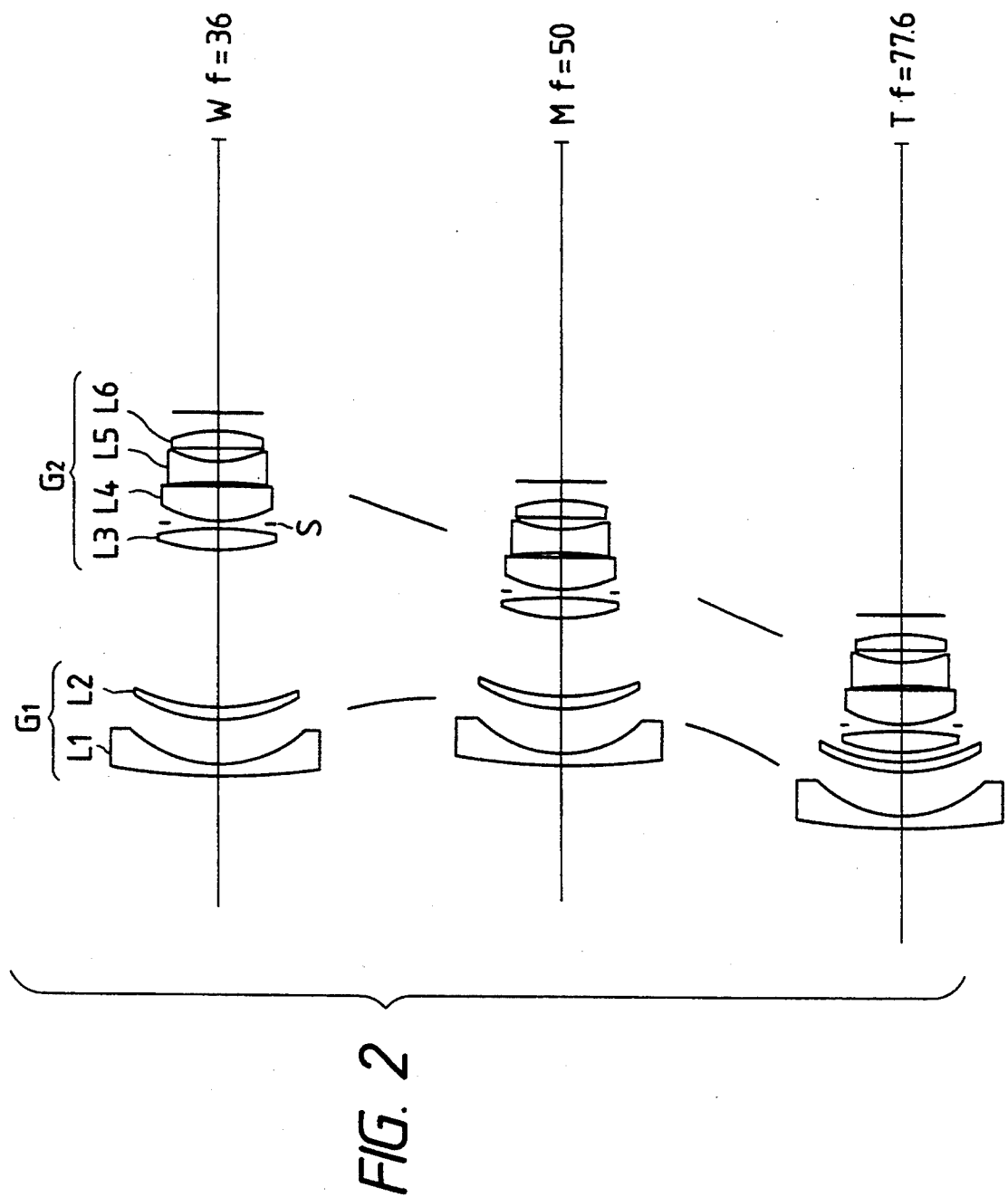
FIG. 2 shows the lens construction of a second embodiment of the present invention.
Figure 3:
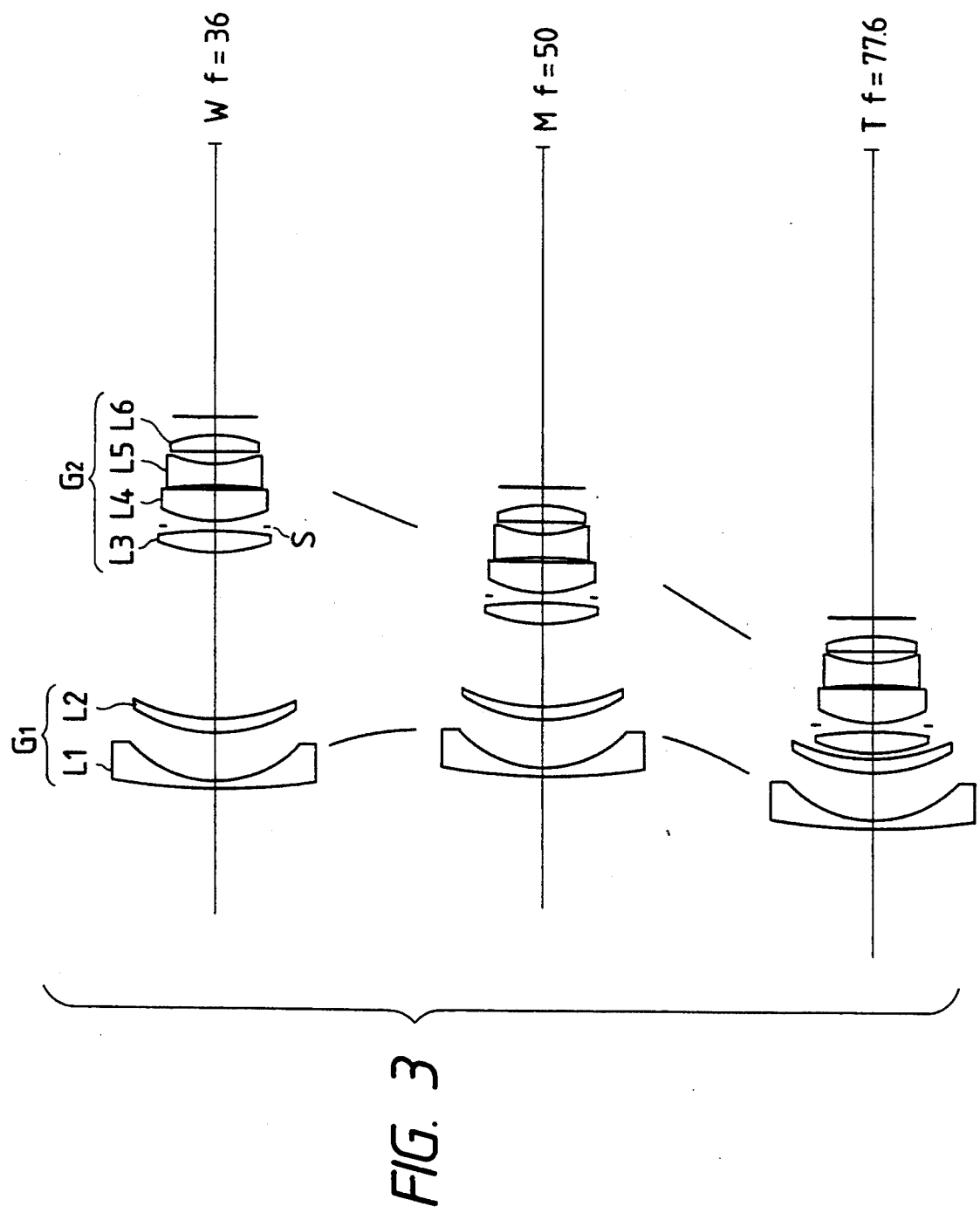
FIG. 3 shows the lens construction of a third embodiment of the present invention.
Figure 4:
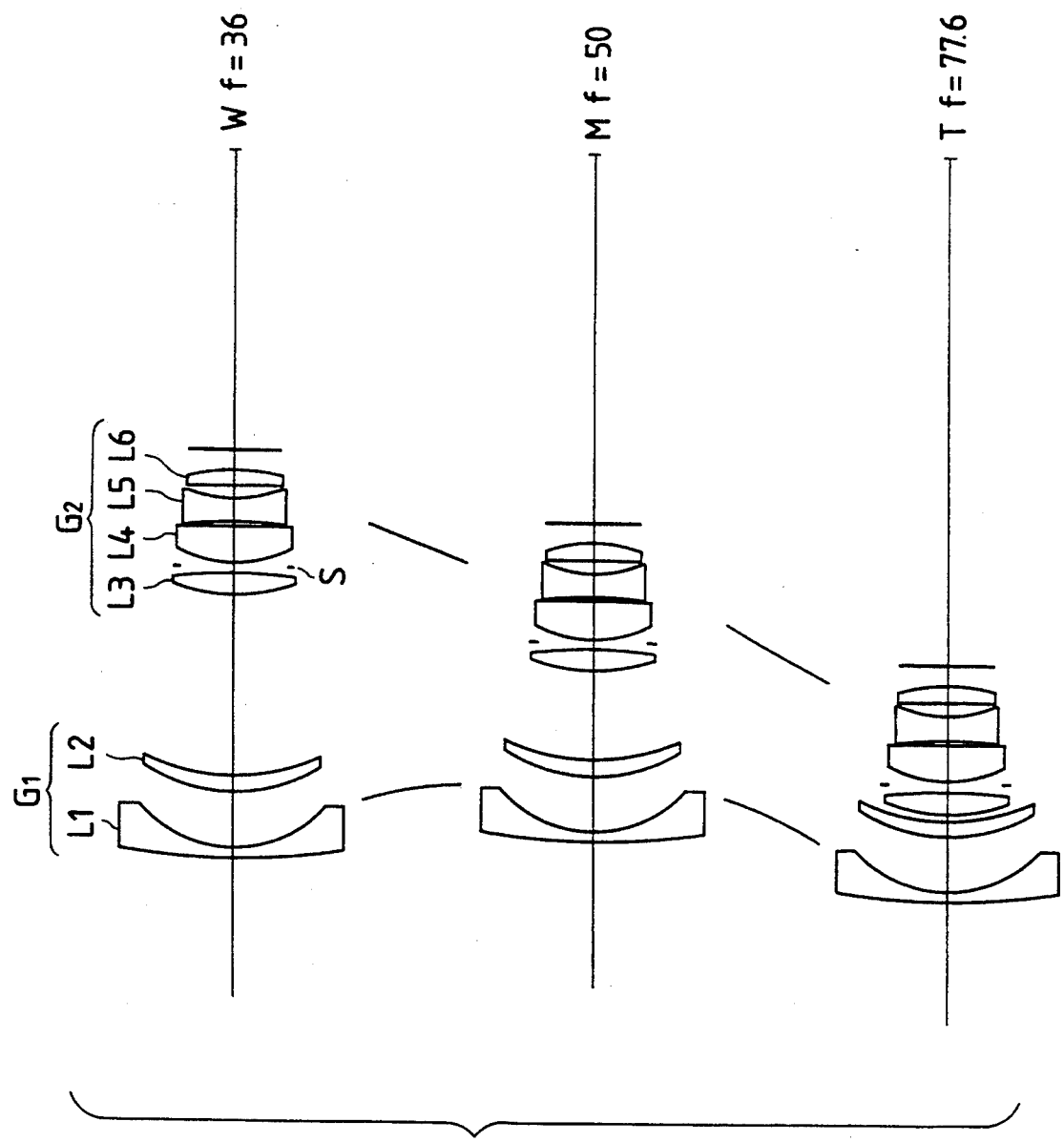
FIG. 4 shows the lens construction of a fourth embodiment of the present invention.

Second to fourth embodiments of the present invention, as shown in FIGS. 2, 3 and 4, respectively, have a lens construction similar to that of the above-described first embodiment. In any of the embodiments of the present invention, an aspherical surface is adopted as the second surface in the first lens unit G1, i.e., the concave surface of the negative meniscus lens L1 which is adjacent to the image side, but in the fourth embodiment, this aspherical surface is formed by cementing a thin resin layer to the concave surface of a negative meniscus-shaped glass lens, and constitutes a so-called compound type aspherical lens.

Figure 5:
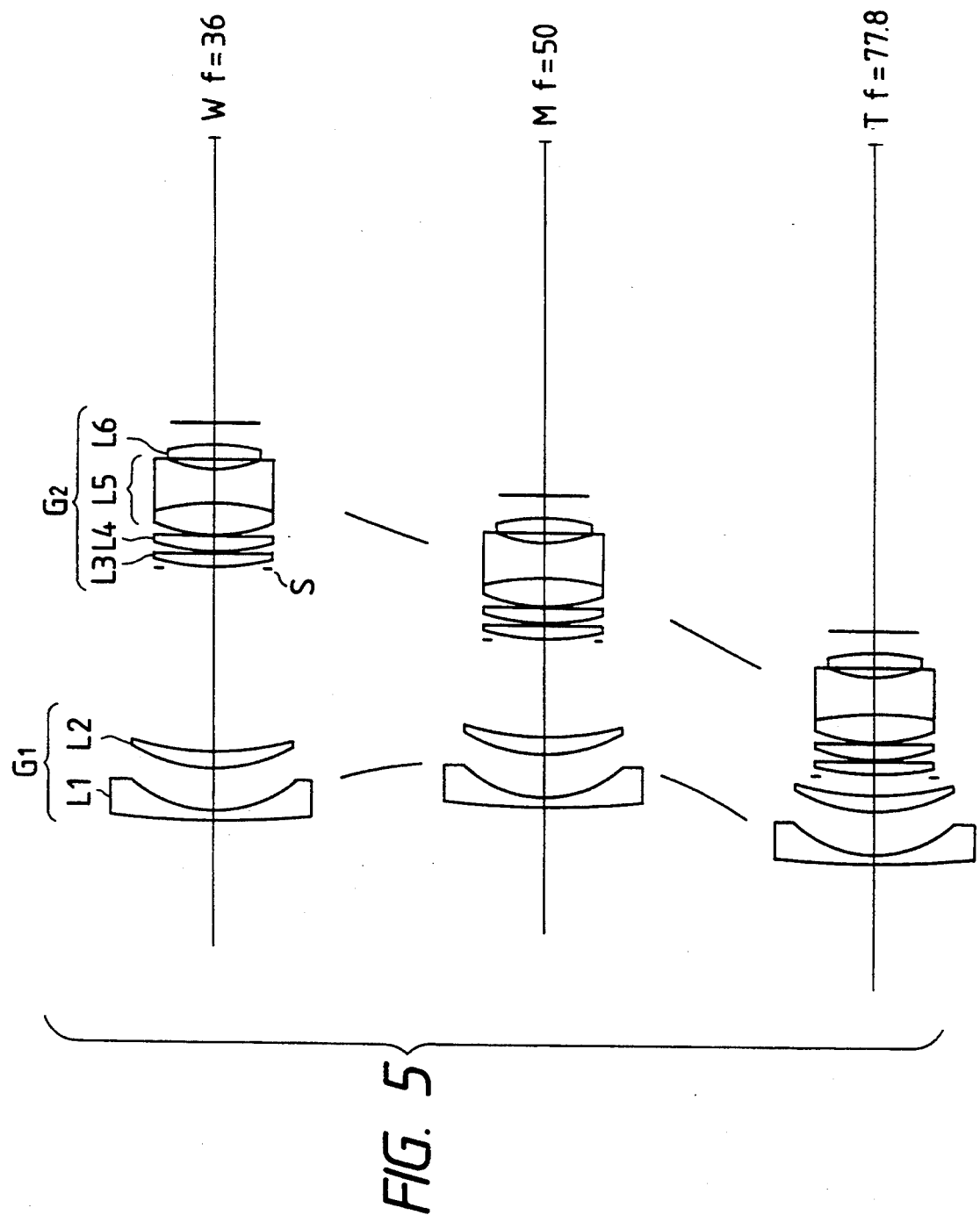
FIG. 5 shows the lens construction of a fifth embodiment of the present invention.

A fifth embodiment of the present invention, as shown in FIG. 5, is such that a biconcave negative lens L5 in the second lens unit G2 is comprised of a biconvex lens and a biconcave lens cemented together. The iris diaphragm S is disposed at that side of the second lens unit G2 which is most adjacent to the object side. Where like this, the negative lens L5 in the second lens unit G2 is constructed as a cemented negative lens, further correction of chromatic aberration becomes possible, and for the improvement of various aberrations, it is desirable to satisfy the following conditions:

$$nN - nP \geq 0.1 \quad (10)$$

$$dN > dP, \quad (11)$$

where
- nP: refractive index of the positive lens in the cemented negative lens L5 in said second lens unit for d-line,
- nN: refractive index of the negative lens in the cemented negative lens L5 in said second lens unit for d-line,
- dN: on-axis center thickness of the negative lens in the cemented negative lens L5 in said second lens unit,
- dP: on-axis center thickness of the positive lens in the cemented negative lens L5 in said second lens unit.

Where like this, the negative lens L5 is a cemented lens comprising a positive and a negative lens, it is advantageous for setting Petzval sum to an appropriate value, and is also further advantageous for correcting the spherical aberration at the telephoto side. At this time, it is preferable to satisfy condition (10) and condition (11), and if condition (10) is not satisfied, the effect for Petzval sum will decrease, and this is not preferable. Also, if condition (11) is satisfied, in case of the present invention, the correction of the spherical aberration at the telephoto side will empirically become advantageous.

Figure 6:
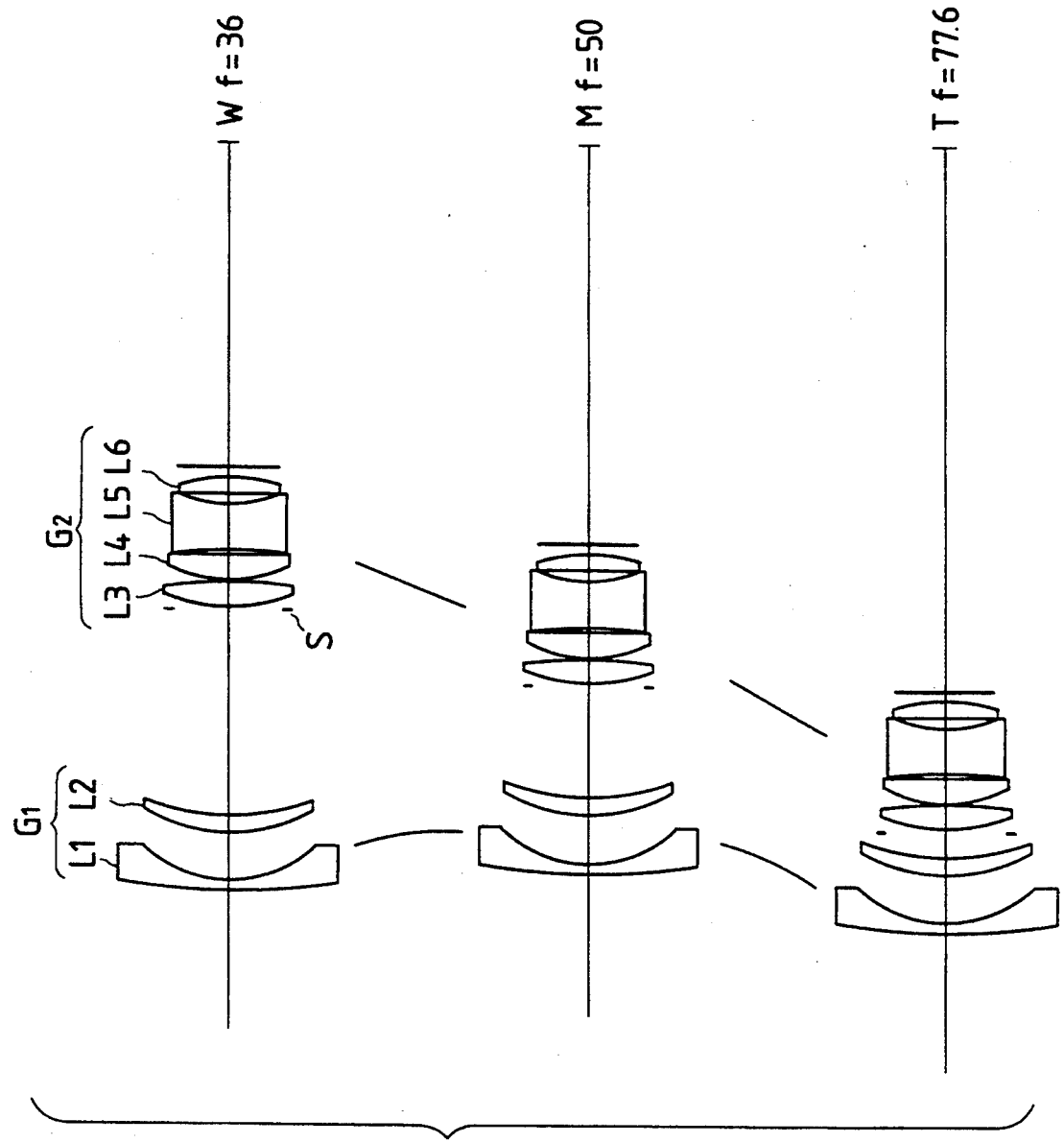
FIG. 6 shows the lens construction of a sixth embodiment of the present invention.

A sixth embodiment of the present invention shown in FIG. 6 is such that the negative lens L5 constructed as a cemented lens in the above-described fifth embodiment is constructed as a single lens.

The numerical data of the first to sixth embodiments of the present invention will be shown in Tables 1 to 6 below. It is to be understood that the shape of the aspherical surface is expressed as follows when the y-axis is plotted in the direction of the optical axis with the vertex of the aspherical surface as the origin and S(y) is the height y from the optical axis and R is the radius of curvature of the vertex and k is the cone coefficient and Cn is the n-order aspherical surface coefficient:

$$S(y) = \frac{y^2/R}{1 + (1 - k \cdot y^2/R^2)^{\frac{1}{2}}} + C2 \cdot y^2 + C4 \cdot y^4 + C6 \cdot y^6 + C8 \cdot y^8 + C10 \cdot y^{10}$$

At this time, the radius of curvature r of the vertex is represented by $r = 1/(2 \cdot C2 + 1/R)$.

In each of the tables below, d represents the surface spacing, $\nu$ represents Abbe number, n represents refractive index, W represents the wide angle end, M represents the medium state, T represents the telephoto end, and a-b in the indication of the aspherical surface coefficient means $a \times 10^{-b}$.

TABLE 1

Numerical Data of the First Embodiment $f = 36 \sim 77.6$
$F_{no} = 4.1 \sim 5.75$
$2\omega = 64.2 \sim 30.8$

| | r | d | $\nu$ | n | |
|---|---|---|---|---|---|
| 1) | 83.4313 | 1.6000 | 49.45 | 1.772789 | L 1 |
| 2) | 19.5231 | 7.7416 | | | |
| 3) | 23.7656 | 2.5000 | 23.01 | 1.860741 | L 2 |
| 4) | 30.8899 | (d4 = variable) | | | |
| 5) | 26.8010 | 3.2500 | 61.09 | 1.589130 | L 3 |
| 6) | −99.3871 | 1.5000 | | | |
| 7) | 19.5090 | 5.2000 | 64.10 | 1.516800 | L 4 |
| 8) | 130.8677 | .7500 | | | |
| 9) | −54.6110 | 3.4000 | 27.61 | 1.755200 | L 5 |
| 10) | 18.2643 | 2.1000 | | | |
| 11) | −282.8297 | 2.4500 | 31.08 | 1.688930 | L 6 |
| 12) | −26.2961 | (Bf = variable) | | | |

The iris diaphragm is located at 0.5 on the object side of the positive lens L4.

The fixed diaphragm is located at 3.0 on the image side of the positive lens L6.

| (aspherical surface coefficient of the second surface) | | | | | |
|---|---|---|---|---|---|
| K | C 2 | C 4 | C 6 | C 8 | C10 |
| 1.0000 | .00000 | −2.49210-006 | 8.27490-009 | −8.94680-011 | 5.26300-014 |

| (variable spacing for magnification change) | | |
|---|---|---|
| | W | M | T |
| d4 | 29.48627 | 14.60627 | .99743 |
| Bf | 46.7067 | 56.61191 | 76.13903 |

(numerical values corresponding to conditions)

$|f_1/(f_w \cdot f_t)^{\frac{1}{2}}| = 0.984$
$|f_1|/f_t = 0.670$
$f_2/f_t = 0.474$
$d_{5-6}/f_t = 0.0271$
$d_{1-2}/D_1 = 0.654$
$d_5/D_2 = 0.182$ -continued (aspherical surface coefficient of the second surface)

$|AS - S|/f_T = 0.00138$ (the value at 0 = 26.4)

TABLE 2

Numerical Data of the Second Embodiment $f = 36 \sim 77.6$
$F_{no} = 4.1 \sim 5.75$
$2\omega = 64.2 \sim 30.8$

| | r | d | ν | n | |
|---|---|---|---|---|---|
| 1) | 100.0055 | 1.8000 | 49.45 | 1.772789 | L 1 |
| 2) | 18.3572 | 6.7333 | | | |
| 3) | 22.9642 | 2.1000 | 23.01 | 1.860741 | L 2 |
| 4) | 31.0612 | (d4 = variable) | | | |
| 5) | 26.6262 | 3.1000 | 61.09 | 1.589130 | L 3 |
| 6) | −77.2457 | 1.3000 | | | |
| 7) | 18.3947 | 5.2000 | 64.10 | 1.516800 | L 4 |
| 8) | 150.8155 | .7500 | | | |
| 9) | −54.8703 | 3.4000 | 27.61 | 1.755200 | L 5 |
| 10) | 16.9453 | 2.1000 | | | |
| 11) | −403.5986 | 2.4500 | 31.08 | 1.688930 | L 6 |
| 12) | −26.7590 | (Bf = variable) | | | |

The iris diaphragm is located at 0.3 on the object side of the positive lens L4.

The fixed diaphragm is located at 3.0 on the image side of the positive lens L6.

(aspherical surface coefficient of the second surface)

| K | C 2 | C 4 | C 6 | C 8 | C10 |
|---|---|---|---|---|---|
| 1.0000 | .00000 | −3.75270-006 | 2.13680-008 | −1.90160-010 | 2.05450-013 |

(variable spacing for magnification change)

| | W | M | T |
|---|---|---|---|
| d4 | 24.28590 | 12.12124 | .99581 |
| Bf | 45.29808 | 55.64578 | 76.04525 |

(numerical values corresponding to conditions)

$|f_1/(f_w \cdot f_t)^{\frac{1}{2}}| = 0.870$
$|f_1|/f_t = 0.593$
$f_2/f_t = 0.438$
$d_{5-6}/f_t = 0.0271$
$d_{1-2}/D_1 = 0.633$
$d_5/D_2 = 0.186$
$|AS - S|/f_T = 0.00130$ (the value at 0 = 24.8)

TABLE 3

Numerical Data of the Third Embodiment $f = 36 \sim 77.6$
$F_{no} = 3.9 \sim 5.75$
$2\omega = 64.2 \sim 30.9$

| | r | d | ν | n | |
|---|---|---|---|---|---|
| 1) | 86.9095 | 1.6000 | 49.45 | 1.772789 | L 1 |
| 2) | 18.6783 | 7.6000 | | | |
| 3) | 23.4846 | 2.5000 | 23.01 | 1.860741 | L 2 |
| 4) | 30.8545 | (d4 = variable) | | | |
| 5) | 26.7679 | 3.2500 | 61.09 | 1.589130 | L 3 |
| 6) | −89.6578 | 1.5000 | | | |
| 7) | 19.2836 | 5.2000 | 64.10 | 1.516800 | L 4 |
| 8) | 155.2722 | .7500 | | | |
| 9) | −53.3715 | 3.4000 | 27.61 | 1.755200 | L 5 |
| 10) | 17.9215 | 2.1000 | | | |
| 11) | −342.3326 | 2.4500 | 31.08 | 1.688930 | L 6 |
| 12) | −26.3265 | (Bf = variable) | | | |

The iris diaphragm is located at 0.5 on the object side of the positive lens L4.

The fixed diaphragm is located at 3.0 on the image side of the positive lens L6.

(aspherical surface coefficient of the second surface)

| K | C 2 | C 4 | C 6 | C 8 | C10 |
|---|---|---|---|---|---|
| 1.0000 | .00000 | −3.36490-006 | 9.19170-009 | −1.09670-010 | 1.28360-014 |

(variable spacing for magnification change)

| | W | M | T |
|---|---|---|---|
| d4 | 26.37479 | 13.12130 | .99992 |
| Bf | 46.70559 | 57.05943 | 77.47117 |

(numerical values corresponding to conditions)

$|f_1/(f_w \cdot f_t)^{\frac{1}{2}}| = 0.908$
$|f_1|/f_t = 0.619$
$f_2/f_t = 0.4579$
$d_{5-6}/f_t = 0.0271$
$d_{1-2}/D_1 = 0.650$
$d_5/D_2 = 0.182$
$|AS - S|/f_T = 0.00196$ (the value at 0 = 26.4)

TABLE 4

Numerical Data of the Fourth Embodiment $f = 36 \sim 77.6$
$F_{no} = 3.9 \sim 5.75$
$2\omega = 64.2 \sim 30.9$

| | r | d | ν | n | |
|---|---|---|---|---|---|
| 1) | 86.9956 | 1.6000 | 49.45 | 1.772789 | L 1 |
| 2) | 19.1000 | .0600 | 55.86 | 1.497120 | |
| 3) | 18.5101 | 7.6000 | | | |
| 4) | 23.4458 | 2.5000 | 23.01 | 1.860741 | L 2 |
| 5) | 30.7230 | (d5 = variable) | | | |
| 6) | 26.7554 | 3.2500 | 61.09 | 1.589130 | L 3 |
| 7) | −90.4215 | 1.5000 | | | |
| 8) | 19.2914 | 5.2000 | 64.10 | 1.516800 | L 4 |
| 9) | 156.1833 | .7500 | | | |
| 10) | −53.4296 | 3.4000 | 27.61 | 1.755200 | L 5 |
| 11) | 17.9342 | 2.1000 | | | |
| 12) | −348.0171 | 2.4500 | 31.08 | 1.688930 | L 6 |
| 13) | −26.3312 | (Bf = variable) | | | |

The iris diaphragm is located at 0.5 on the object side Of the positive lens L4.

The fixed diaphragm is located at 3.0 on the image side of the positive lens L6

(aspherical surface coefficient of the second surface)

| K | C 2 | C 4 | C 6 | C 8 | C10 |
|---|---|---|---|---|---|
| 1.0000 | .00000 | −5.36710-006 | 1.58210-008 | −1.83150-010 | 7.78280-014 |

(variable spacing for magnification change)

| | W | M | T |
|---|---|---|---|
| d5 | 26.37475 | 13.12126 | .99988 |
| Bf | 46.71849 | 57.07205 | 77.48297 |

(numerical values corresponding to conditions)

$|f_1/(f_w \cdot f_t)^{\frac{1}{2}}| = 0.908$
$|f_1|/f_t = 0.619$
$f_2/f_t = 0.457$
$d_{5-6}/f_t = 0.0271$
$d_{1-2}/D_1 = 0.646$
$d_5/D_2 = 0.182$
$|AS - S|/f_T = 0.00304$ (the value at 0 = 26.4)

TABLE 5

Numerical Data of the Fifth Embodiment $f = 36 \sim 77.8$
$F_{no} = 4.1 \sim 5.75$
$2\omega = 64.5 \sim 31$

| | r | d | ν | n | |
|---|---|---|---|---|---|
| 1) | 142.1176 | 1.6000 | 45.37 | 1.796681 | L 1 |
| 2) | 19.0548 | 7.0156 | | | |
| 3) | 27.3310 | 2.5000 | 23.01 | 1.860741 | L 2 |
| 4) | 44.3481 | (d4= variable) | | | |
| 5) | 45.8539 | 2.0000 | 64.10 | 1.516800 | L 3 |

TABLE 5-continued

Numerical Data of the Fifth Embodiment $f = 36 \sim 77.8$
$F_{no} = 4.1 \sim 5.75$
$2\omega = 64.5 \sim 31$

|    | r         | d              | ν     | n        |     |
|----|-----------|----------------|-------|----------|-----|
| 6) | 1876.9512 | .1000          |       |          |     |
| 7) | 28.1454   | 2.5000         | 57.03 | 1.622801 | L 4 |
| 8) | 88.0612   | .1000          |       |          |     |
| 9) | 23.2854   | 5.0000         | 60.64 | 1.603110 | L 5 |
| 10)| −43.8658  | 5.5000         | 33.89 | 1.803840 |     |
| 11)| 16.6905   | 1.8308         |       |          |     |
| 12)| −171.2797 | 2.3000         | 40.90 | 1.796310 | L 6 |
| 13)| −33.8193  | (Bf = variable)|       |          |     |

The iris diaphragm is located at 0.4 on the object side of the positive lens L3.

The fixed diaphragm is located at 3.5 on the image side of the positive lens L6.

(aspherical surface coefficient of the second surface)

| K | C 2 | C 4 | C 6 | C 8 | C10 |
|---|-----|-----|-----|-----|-----|
| 1.0000 | .00000 | −5.80580-006 | 3.21170-009 | −1.11960-010 | 8.18520-017 |

(variable spacing for magnification change)

|    | W        | M        | T        |
|----|----------|----------|----------|
| d4 | 29.65441 | 15.97216 | 3.40037  |
| Bf | 48.90393 | 59.59326 | 80.81916 |

(numerical values corresponding to conditions)

$|f_1/(f_w \cdot f_t)^{\frac{1}{2}}| = 0.907$
$|f_1|/f_t = 0.617$
$f_2/f_t = 0.471$
$d_{5-6}/f_t = 0.0235$
$d_{1-2}/D_1 = 0.631$
$d_5/D_2 = 0.242$
$|AS - S|/f_T = 0.00262$ (the value at 0 = 25.0)

TABLE 6

Numerical Data of the Sixth Embodiment $f = 36 \sim 77.6$
$F_{no} = 4.1 \sim 5.74$
$2\omega = 63.7 \sim 30°$

|     | r         | d               | ν     | n        |     |
|-----|-----------|-----------------|-------|----------|-----|
| 1)  | 80.8811   | 1.6000          | 45.37 | 1.796681 | L 1 |
| 2)  | 18.0272   | 7.1307          |       |          |     |
| 3)  | 24.0548   | 2.6500          | 23.01 | 1.860741 | L 2 |
| 4)  | 33.8315   | (d4 = variable) |       |          |     |
| 5)  | 25.4902   | 3.6500          | 64.10 | 1.516800 | L 3 |
| 6)  | −72.8555  | .1000           |       |          |     |
| 7)  | 20.4526   | 3.8000          | 60.69 | 1.563840 | L 4 |
| 8)  | 909.5865  | .6500           |       |          |     |
| 9)  | −66.7942  | 6.5000          | 33.89 | 1.803840 | L 5 |
| 10) | 17.6263   | 1.8000          |       |          |     |
| 11) | −506.0917 | 2.2000          | 47.07 | 1.670030 | L 6 |

TABLE 6-continued

Numerical Data of the Sixth Embodiment $f = 36 \sim 77.6$
$F_{no} = 4.1 \sim 5.74$
$2\omega = 63.7 \sim 30°$

|     | r        | d               | ν | n |
|-----|----------|-----------------|---|---|
| 12) | −28.8896 | (Bf = variable) |   |   |

The iris diaphragm is located at 0.4 on the object side of the positive lens L3.

The fixed diaphragm is located at 1.5 on the image side of the positive lens L6.

(aspherical surface coefficient of the second surface)

| K | C 2 | C 4 | C 6 | C 8 | C10 |
|---|-----|-----|-----|-----|-----|
| 1.0000 | .00000 | −4.79420-006 | −1.11980-008 | −2.68990-012 | −4.12360-013 |

(variable spacing for magnification change)

|    | W        | M        | T        |
|----|----------|----------|----------|
| d4 | 30.44534 | 16.76314 | 4.24967  |
| Bf | 48.93230 | 59.62137 | 80.69391 |

(numerical values corresponding to conditions)

$|f_1/(f_w \cdot f_t)^{\frac{1}{2}}| = 0.908$
$|f_1|/f_t = 0.619$
$f_2/f_t = 0.472$
$d_{5-6}/f_t = 0.0232$
$d_{1-2}/D_1 = 0.626$
$d_5/D_2 = 0.348$
$|AS - S|/f_T = 0.00269$ (the value at 0 = 25.2)

It is apparent that any of the embodiments of the present invention comprises a very simple construction which has a wide magnification range of a magnification change ratio 2.1 times or greater and yet is compact over the entire magnification change range and moreover comprises six units six lenses or six units seven lenses, but yet maintains a good imaging performance.

Each of the above-described embodiments adopts a construction in which a fixed diaphragm is installed rearwardly of the second lens unit G2 to effectively intercept the off-axis marginal rays greatly creating upward coma and is moved with the second lens unit G2, but of course, it is possible to adopt a construction which provides a movement locus differing from that of the second lens unit G2. It is also possible to introduce an aspherical surface not only into the first lens unit G1 but also into the second lens unit G2, and make it bear the correction of off-axis aberrations such as spherical aberration and curvature of image field to thereby further decrease the number of lens components. The aperture stop is not restricted to the location shown in the above-described embodiments, but can also be installed immediately forwardly of the negative lens L5 in the second lens unit G2.

What is claimed is:

1. A zoom lens of two-unit construction comprising a first lens unit having negative refractive power as a whole and a second lens unit having positive refractive power as a whole, and effecting a magnification change by the spacing between said first lens unit and said second lens unit being varied, characterized in that said first lens unit consists of, in order from the object side, a negative meniscus lens element convex to the object side and concave to the image side and a positive lens element convex to the object side, said second lens unit has, in order from the object side, at least a positive lens element, a positive lens element, a negative lens element concave to the image side, and a positive lens element convex to the image side, said first lens unit has at least one aspherical surface, and said zoom lens satisfies the following condition:

$$0.6 \leq |f_1/(f_W \cdot f_T)^{\frac{1}{2}}| \leq 1.1,$$

where $f_1$ is the focal length of said first lens unit, $f_w$ is the focal length of the entire system at the wide angle end, and $f_T$ is the focal length of the entire system at the telephoto end.

2. A zoom lens of two-unit construction according to claim 1, further characterized in that said zoom lens satisfies the following condition:

$$0.3 \leq |f_1|/f_T \leq 0.83,$$

where $f_1$ is the focal length of said first lens unit, and $f_T$ is the focal length of the entire system at the telephoto end.

3. A zoom lens of two-unit construction according to claim 1, further characterized in that said zoom lens satisfies the following condition:

$$0.3 \leq f_2/f_T \leq 0.6,$$

where $f_2$ is the focal length of said second lens unit, and $f_T$ is the focal length of the entire system at the telephoto end.

4. A zoom lens of two-unit construction according to claim 1, further characterized in that said zoom lens satisfies the following condition:

$$0.005 \leq d_{5-6}/f_T \leq 0.06,$$

where $d_{5-6}$ is the on-axis air gap between the negative lens element and the last recited positive lens element in said second lens unit, and $f_T$ is the focal length of the entire system at the telephoto end.

5. A zoom lens of two-unit construction according to claim 1, further characterized in that said zoom lens satisfies the following conditions:

$$1.7 \leq n_1, \nu d_1 \leq 55,$$

where $n_1$ is the refractive index of the negative lens element in said first lens unit for d-line, and $\nu d_1$ is the Abbe number of the negative lens element in said first lens unit.

6. A zoom lens of two-unit construction according to claim 1, further characterized in that said zoom lens satisfies the following conditions:

$$1.65 \leq n_2, \nu d_2 \leq 36,$$

where $n_2$ is the refractive index of the positive lens element in said first lens unit, and $\nu d_2$ is the Abbe number of the positive lens element in said first lens unit G1.

7. A zoom lens of two-unit construction according to claim 1, further characterized in that said zoom lens satisfies the following condition:

$$0.53 \leq d_{1-2}/D_1 \leq 0.8,$$

where $d_{1-2}$ is the on-axis air gap between the negative lens element and the positive lens element in said first lens unit, and $D_1$ is the on-axis combined thickness from that surface of said first lens unit which is most adjacent to the object side to that surface of said first lens unit which is most adjacent to the image side.

8. A zoom lens of two-unit construction according to claim 1, further characterized in that said zoom lens satisfies the following condition:

$$0.1 \leq d_5/D_2 \leq 0.5,$$

where $d_5$ is the on-axis center thickness of the negative lens element in said second lens unit, and $D_2$ is the on-axis combined thickness from that surface of said second lens unit which is most adjacent to the object side to that surface of said second lens unit which is most adjacent to the image side.

9. A zoom lens of two-unit construction according to claim 1, further characterized in that said first lens unit has at least one aspherical surface, and said zoom lens satisfies the following condition:

$$0.0005 \leq |AS - S|/f_T \leq 0.01,$$

where $|AS-S|$ is the difference in the direction of the optical axis between the aspherical surface at the most marginal edge of the effective diameter of said aspherical surface and a reference spherical surface having a vertex radius of curvature, and $f_T$ is the focal length of the entire system at the telephoto end.

10. A zoom lens of two-unit construction comprising a first lens unit having negative refractive power as a whole and second lens unit having positive refractive power as a whole, and effecting a magnification change by the spacing between said first lens unit and said second lens unit being varied, characterized in that said first lens unit comprises, in order from the object side, a negative meniscus lens element strongly concave to the image side and a positive lens element convex to the object side, said second lens unit has, in order from the object side, at least a positive lens element, a positive lens element, a negative lens element strongly concave to the image side, and a positive lens element convex to the image side, said first lens unit has at least one aspherical surface, and said zoom lens satisfies the following conditions:

$$0.6 \leq |f_1/(f_W \cdot f_T)^{\frac{1}{2}}| \leq 1.1,$$

$$0.53 \leq d_{1-2}/D_1 \leq 0.8$$

where $f_1$ is the focal length of said first lens unit, $f_w$ is the focal length of the entire system at the wide angle end, $f_T$ is the focal length of the entire system at the telephoto end, $d_{1-2}$ is the on-axis air gap between the negative lens element and the positive lens element in said first lens unit, and $D_1$ is the on-axis combined thickness from that surface of said first lens unit which is most adjacent to the object side to that surface of said first lens unit which is most adjacent to the image side.

11. A zoom lens of two-unit construction according to claim 10, further characterized in that said zoom lens satisfies the following conditions:

$$1.7 \leq n_1, \nu d_1 \leq 55,$$

where $n_1$ is the refractive index of the negative lens element in said first lens unit for d-line, and $\nu d_1$ is the Abbe number of the negative lens element in said first lens unit.

12. A zoom lens of two-unit construction according to claim 10, further characterized in that said zoom lens satisfies the following conditions:

$1.65 \leq n_2, vd_2 \leq 36$, where $n_2$ is the refractive index of the positive lens element in said first lens unit, and $vd_2$ is the Abbe number of the positive lens element in said first lens unit.

13. A zoom lens of two-unit construction comprising a first lens unit having negative refractive power as a whole and a second lens unit having positive refractive power as a whole, and effecting a magnification change by the spacing between said first lens unit and said second lens unit being varied, characterized in that said first lens unit comprises in order from the object side, a negative meniscus lens element concave to the image side and a positive lens element convex to the object side, said second lens unit has, in order from the object side, at least a positive lens element, a positive lens element, a negative lens element concave to the image side, and a positive lens element convex to the image side, said first lens unit has at least one aspherical surface, and said zoom lens satisfies the following conditions:

$0.6 \leq |f_1/(f_W \cdot f_T)^{\frac{1}{2}}| \leq 1.1$, $0.005 \leq d_{5-6}/f_T \leq 0.06$ where $f_1$ is the focal length of said first lens unit, $f_w$ is the focal length of the entire system at the wide angle end, $f_T$ is the focal length of the entire system at the telephoto end, and $d_{5-6}$ is the on-axis air gap between the negative lens element and the last-recited positive lens element in said second lens unit.

14. A zoom lens of two-unit construction comprising a first lens unit having negative refractive power as a whole and a second lens unit having positive refractive power as a whole, and effecting a magnification change by the spacing between said first lens unit and said second lens unit being varied, characterized in that said first lens unit comprises, in order from the object side, a negative meniscus lens element concave to the image side and a positive lens element convex to the object side, said second lens unit has, in order from the object side, at least a positive lens element, a positive lens element, a negative lens element concave to the image side, and a positive lens element convex to the image side, said first lens unit has at least one aspherical surface, and said zoom lens satisfies the following conditions:

$0.6 \leq |f_1/(f_W \cdot f_T)^{\frac{1}{2}}| \leq 1.1$, $0.0005 \leq |AS-S|/f_T \leq 0.01$, where $f_1$ is the focal length of said first lens unit, $f_W$ is the focal length of the entire system at the wide angle end, $f_T$ is the focal length of the entire system at the telephoto end, and $|AS-S|$ is the difference in the direction of the optical axis between the aspherical surface at the most marginal edge of the effective diameter of said aspherical surface and a reference spherical surface having a vertex radius of curvature.

15. A zoom lens of two-unit construction comprising a first lens unit having negative refractive power as a whole and a second lens unit having positive refractive power as a whole, and effecting a magnification change by the spacing between said first lens unit and said second lens unit being varied, characterized in that said first lens unit comprises, in order from the object side, a negative meniscus lens element concave to the image side and a positive lens element convex to the object side, said second lens unit has, in order from the object side, at least a positive lens element, a positive lens element, a negative lens element concave to the image side, and a positive lens element convex to the image side, said first lens unit has at least one aspherical surface, and said zoom lens satisfies the following conditions:

$0.3 \leq |f_1|/f_T \leq 0.83$, $0.3 \leq f_2/f_T \leq 0.56$ where $f_1$ is the focal length of said first lens unit, $f_T$ is the focal length of the entire system at the telephoto end, and $f_2$ is the focal length of said second lens unit.

16. A zoom lens of two-unit construction according to claim 15, further characterized in that said zoom lens satisfies the following conditions:

$1.7 \leq n_1, vd_1 \leq 55$, where $n_1$ is the refractive index of the negative lens element in said first lens unit for d-line, and $vd_1$ is the Abbe number of the negative lens element in said first lens unit.

17. A zoom lens of two-unit construction according to claim 15, further characterized in that said zoom lens satisfies the following conditions:

$1.65 \leq n_2, vd_2 \leq 36$, where $n_1$ is the refractive index of the positive lens element in said first lens unit, and $vd_2$ is the Abbe number of the positive lens element in said first lens unit.

18. A zoom lens of two-unit construction according to claim 15, further characterized in that said zoom lens satisfies the following condition:

$0.53 \leq d_{1-2}/D_1 \leq 0.8$, where $d_{1-2}$ is the on-axis air gap between the negative lens element and the positive lens element in said first lens unit, and $D_1$ is the on-axis combined thickness from that surface of said first lens unit which is most adjacent to the object side to that surface of said first lens unit which is most adjacent to the image side.

19. A zoom lens of two-unit construction comprising a first lens unit having negative refractive power as a whole and a second lens unit having a positive refractive power as a whole, and effecting a magnification change by the spacing between said first lens unit and said second lens unit being varied, characterized in that said first lens unit comprises, in order from the object side, a negative meniscus lens element concave to the image side and a positive lens element convex to the object side, said second lens unit has, in order from the object side, at least a positive lens element, a positive lens element, a negative lens element concave to the image side, and a positive lens element convex to the image side, said first lens unit has at least one aspherical surface, and said zoom lens satisfies the following condition:

$0.3 \leq |f_2|/f_T \leq 0.56$, where $f_2$ is the focal length of said second lens unit, and $f_T$ is the focal length of the entire system at the telephoto end.

20. A zoom lens of two-unit construction according to claim 19, further characterized in that said zoom lens satisfies the following conditions:

$$1.7 \leq n_1, \nu d_1 \leq 55,$$

where $n_1$ is the refractive index of the negative lens element in said first lens unit for d-line, and $\nu d_1$ is the Abbe number of the negative lens element in said first lens unit.

21. A zoom lens of two-unit construction according to claim 19, further characterized in that said zoom lens satisfies the following conditions:

$$1.65 \leq n_2, \nu d_2 \leq 36,$$

where $n_2$ is the refractive index of the positive lens element in said first lens unit, and $\nu d_2$ is the Abbe number of the positive lens element in said first lens unit.

22. A zoom lens of two-unit construction according to claim 19, further characterized in that said zoom lens satisfies the following condition:

$$0.53 \leq d_{1-2}/D_1 \leq 0.8,$$

where $d_{1-2}$ is the on-axis air gap between the negative lens element and the positive lens element in said first lens unit, and $D_1$ is the on-axis combined thickness from that surface of said first lens unit which is most adjacent to the object side to that surface of said first lens unit which is most adjacent to the image side.

* * * * *

UNITED STATES PATENT AND TRADEMARK OFFICE
CERTIFICATE OF CORRECTION

PATENT NO. : 5,452,134
DATED : September 19, 1995
INVENTOR(S) : Haruo Sato

It is certified that error appears in the above-indentified patent and that said Letters Patent is hereby corrected as shown below:

In Claim 6:
line 7, delete "G1".

In Claim 10:
line 8, delete "strongly";
line 12, delete "strongly";
line 17, "$0.6 \leq |f_1(f_w f_T)^{1/2} \leq 1.1$" should read
--$0.6 \leq |f_1/(f_w f_T)^{1/2}| \leq 1.1$--.

In Claim 12:
line 4, "$1.65 n_2, \nu d_2 \leq 36,$" should read
--$1.65 \leq n_2, \nu d_2 \leq 36,$--.

In Claim 19:
line 17, "$0.3 \leq |f_2|f_T \leq 0.56$" should read
--$0.3 \leq f_2/f_T \leq 0.56$--.

Signed and Sealed this

Twenty-first Day of July, 1998

Attest:

BRUCE LEHMAN

Attesting Officer     Commissioner of Patents and Trademarks